Nov. 24, 1959
E. O. SCHWEITZER
2,913,909
PRESSURE TRANSMITTER
Filed Aug. 27, 1953
2 Sheets-Sheet 1
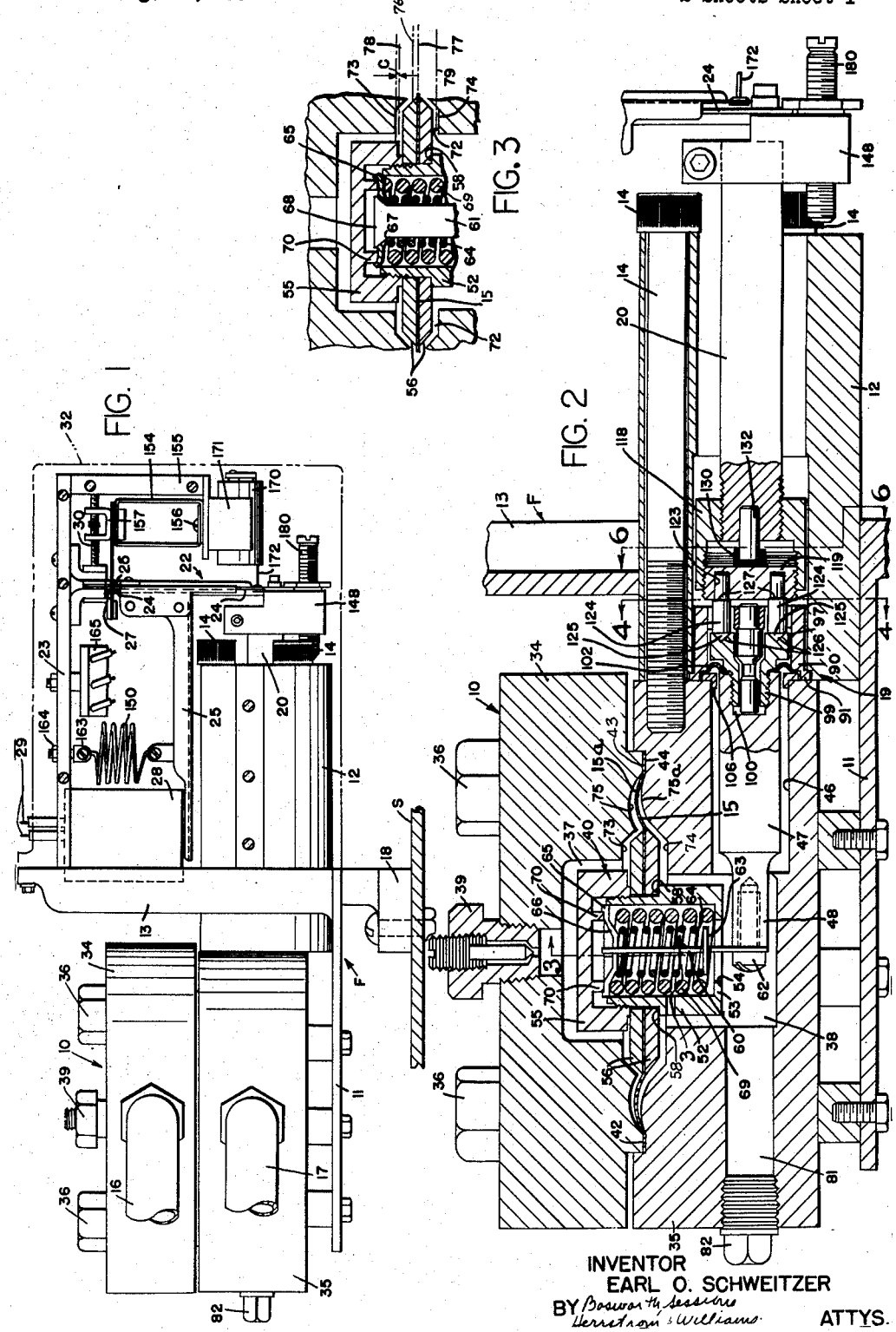
INVENTOR
EARL O. SCHWEITZER
BY Bosworth Sessions
Herrstrom & Williams    ATTYS.

Nov. 24, 1959 — E. O. SCHWEITZER — 2,913,909
PRESSURE TRANSMITTER
Filed Aug. 27, 1953 — 2 Sheets-Sheet 2

INVENTOR.
EARL O. SCHWEITZER
BY
Bosworth, Sessions, Herrstrom
& William
ATTYS.

United States Patent Office 2,913,909
Patented Nov. 24, 1959

2,913,909

PRESSURE TRANSMITTER

Earl O. Schweitzer, Wickliffe, Ohio, assignor to The Swartwout Company, Cleveland, Ohio, an Ohio corporation Application August 27, 1953, Serial No. 376,931

5 Claims. (Cl. 74—18.1)

This invention relates to transmitters of the type employed in a control, indicating and recording system for sensing instantaneous values and/or changes in values of a condition or variable being measured, such as flow, pressure and liquid level, and transmitting signals corresponding to the values of the condition or variable to the other parts of the control, indicating and/or recording system.

Transmitters and especially those employing diaphragms which operate on a principle of displacement and/or force of the diaphragm in response to a variable being measured are designed for minimum displacement of the movable element throughout the measuring range. The advantages of such design are a simpler and more economical construction, and greater accuracy of the transmitter by minimizing any spring effect of the diaphragm and by maintaining the effective diaphragm area substantially constant over the full range of diaphragm movement. Since the movement of the diaphragm is small, the mechanism or linkage connected to it for carrying the movement outside the body which houses the diaphragm to actuate the control or indicating system must be highly accurate. The construction of such a transmitter is further complicated when both sides of the diaphragm are subjected to relatively high static pressures as in differential pressure transmitters, which condition requires that the sensitive motion transmitting linkage pass through a seal capable of withstanding high static pressures without impairment of the motion translating accuracy of the linkage. My invention comprehends an improved construction of such a differential pressure transmitter.

A general object of my invention is to provide a transmitter capable of transmitting a signal motion from a pressure vessel or force which accurately corresponds to the value or change in value of a condition being measured. A more specific object is to provide a pressure responsive transmitter that is able to withstand high static pressures without impairing the operation of the mechanism or the accuracy of signal transmission. Another object is to provide a transmitter in which a measuring diaphragm, which moves a minimum distance over the full measuring range, is capable of actuating a signal conversion device which responds to movements of much greater magnitude. Another object is to provide a transmitter that is compact and self contained and may contain mechanism for greatly amplifying signal motion from the measuring diaphragm. Another object is to provide a transmitter capable of transmitting a signal, either motion or force, that is directly proportional to the value of the variable being measured.

A further object is to provide for the accurate transmission of motion or force and motion from the interior to the exterior of a pressure vessel without loss of fluid from or pressure in the vessel and without adulteration of the true relation between the force or motion within the vessel to that transmitted to the exterior of the vessel. A further object is to provide a mounting and seal for a lever to pass from within to without a pressure vessel for the free and true transmission of force and motion from within to without the vessel. Another object is to provide a pressure seal fulcrum which permits a signal motion or force to be accurately transmitted therethrough and yet is capable of sealing fluids under high static pressures within the transmitter pressure body. A more specific object is to provide a transmitter with a pressure seal fulcrum in which forces resulting from pressure fluid being sealed within the transmitter pressure body are accurately balanced at all times around the fulcrum point throughout the full range of pivotal movement of the linkage passing through the seal. Another object is to provide a pressure seal fulcrum with a movable diaphragm sealing member so disposed that the effective area of the sealing member does not change substantially or deleteriously when the motion transmitting linkage pivots about the fulcrum. Another object is to provide a pressure seal fulcrum that may be conveniently, accurately, and permanently aligned during assembly of the pressure transmitter.

Another object is to provide a transmitter that is dustproof and is sturdy so as to maintain its calibration under conditions of vibration. And finally, an object of my invention is to provide a transmitter which is substantially free of friction from moving parts and therefore is perenially accurate, long lasting and requires little maintenance.

These and other objects of my invention will become apparent from the following description of a preferred form thereof, reference being had to the accompanying drawings.

Figure 1 is a side elevation of a complete differential transmitter embodying my invention, the cover for a portion of the assembly having been removed to show the details of construction.

Figure 2 is an enlarged central section through the pressure body and pressure seal portions of the transmitter taken along the plane of the line 2—2 of Figure 4.

Figure 3 is a section taken on the line 3—3 of Figure 2.

Figure 4:
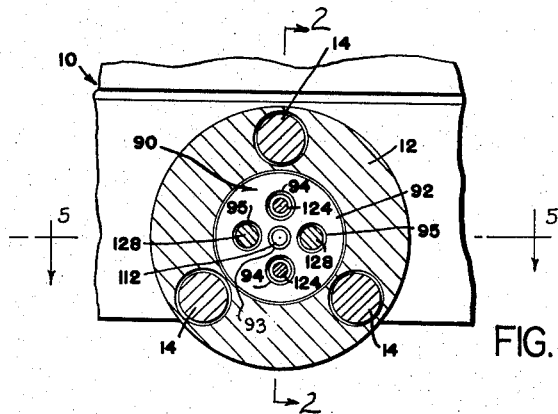
Figure 4 is a transverse section through the pressure seal taken on the line 4—4 of Figure 2.

Referring now to the drawings, a preferred embodiment of my invention is illustrated in Figure 1 as a transmitter assembly comprising pressure body 10 carried on a platform 11 of a mounting frame F and having an elongated casing 12 for the motion transmitting linkage projecting through an upright wall 13 of the frame F and secured to the pressure body 10 by screws 14. Carried within the pressure body 10 is a pressure measuring diaphragm 15, see Figure 2, which is responsive to pressures impressed upon it and which flexes and moves an amount proportional to the magnitude of the impressed pressures. I prefer to illustrate and describe my invention in conjunction with a transmitter that is responsive to a variable differential pressure for measuring, for example, the height of liquid level or the rate of flow in a fluid line, that is, measuring pressure difference across an orifice plate or a venturi throat in a fluid flow line. For this purpose, conduits 16 and 17 leading from the low and high pressure sides, respectively, of the orifice in the fluid flow line, not shown, are connected to the pressure body 10 on opposite sides of the diaphragm 15 and impress the differential pressure to be measured on the diaphragm 15. The high pressure connection to the pressure body 10 is made on the lower side of the diaphragm in the preferred illustrated embodiment of my invention and hence the diaphragm 15 will move up as viewed under increasing differential pressures and down when the differential pressure decreases. Flanges 18 on the mounting frame F are provided for securing the transmitter assembly to a suitable support S.

Movement of diaphragm 15 in response to pressures impressed upon it is transmitted by suitable linkage through a pressure seal assembly, generally indicated at 19 in Figure 2, which prevents escape of high pressure fluid from the pressure body 10 while permitting the signal motion initiated by diaphragm 15 to be transmitted externally of the pressure body. An external lever 20 disposed within casing 12 and connected at the inner end to the pressure seal assembly 19 swings vertically as shown in response to movements of the measuring diaphragm 15.

The normal range of operative movement of the measuring diaphragm 15 in pressure body 10 preferably is quite small, that is, in the order of .002". In order to amplify or multiply such motion to a greater value for initiating and sending a signal to a control or indicating system and also to provide for adjustment of the span of the pressure range to which the measuring diaphragm 15 is responsive, I provide a linkage generally indicated at 22, and located at the right, as viewed in Figure 1, and of the transmitter assembly. The linkage 22 is supported on a rigid member 23 constituting part of the mounting frame F and comprises a depending link 24 connected to the right as viewed end of lever 20, and an arm 25 mounted on a fixed pivot 26 and adapted to pivot about a horizontal axis. Link 24 is operatively connected to arm 25 through a movable pivot 27 normally offset from fixed pivot 26 and through the moment thus created induces pivoting of arm 25 about the fixed pivot 26. The remote, left as viewed, end of arm 25 is connected preferably to the core of a differential transformer 28 which converts the signal motion of the arm 25 into an A.-C. voltage which constitutes an electrical signal and which is transmitted by lines 29 to a suitable control system of the type, for example, described in the co-pending application of Charles J. Swartwout, Serial No. 308,278, filed September 2, 1952, entitled Control System, now Patent No. 2,759,129, issued August 14, 1956. The multiplication ratio of the linkage 22, inter alia, is dependent upon the moment which induces pivoting of arm 25, that is, the amount of offset between movable pivot 27 and fixed pivot 26, and since the relative distance between the pivots is small, slight movement of lever 20 will cause a relatively large movement of the differential transformer core at the left as viewed end of arm 25. The range of movement of this core may be and preferably is in the order of .050". Thus movement of the measuring diaphragm 15 over an operating range of about .002" can be utilized to move the differential transformer core through a range about 25 times as great.

The motion amplifying ratio of linkage 22 and the magnitude of the force developed by measuring diaphragm 15 which is required to move the differential transformer core through its full range of movement is varied by changing the relative distance between the fixed pivot 26 and the movable pivot 27. This adjustment is accomplished by means of ratio adjusting screw 30 which is operatively connected to movable pivot 27 for adjusting the position of the latter relative to fixed pivot 26. The construction of the linkage which permits this ratio adjustment to be accomplished without sliding fulcrums, friction-type pivots and without the necessity of the operator touching any moving parts of the linkage will be described more fully below.

The linkage 22, the differential transformer 28 and a portion of the elongated casing 12 are enclosed within a dustproof cover 32, indicated in dotted outline to the right in Figure 1, which is suitably detachably secured to walls 13 of the mounting frame F.

*Pressure body.*—The pressure body 10 of the differential pressure transmitter preferably is a cylindrical unit made of corrosion resistant material such as stainless steel and comprises an upper section 34 and a lower section 35 fastened together at their peripheries by screws 36. The upper section 34 has a central cavity or upper pressure chamber 37 communicating with low pressure conduit 16, see Figure 1, and the lower section has a similar central cavity 38 constituting a pressure chamber which communicates with high pressure conduit 17. Chamber 37 therefore is the low pressure chamber while chamber 38 is the high pressure chamber. A venting plug 39 permits removal of entrapped air from upper chamber 37 when the unit is placed in operation. Pressure chambers 37 and 38 are separated from each other by a diaphragm assembly 40 comprising a relatively thin flexible preferably stainless steel pressure measuring diaphragm 15 secured and sealed along its outer peripheral portions 42 between and to the mating surfaces of the upper and lower body sections 34 and 35. Preferably, upper section 34 is slightly spaced from the lower section 35 as shown and has an annular seating portion 43 which engages a corresponding annular seat 44 in the lower section 35, the peripheral portion 42 of the diaphragm being disposed therebetween and being securely held and tightly sealed in place under the pressure of screws 36 which hold the sections together. The exposed arcuate portion 15a of the diaphragm preferably curves upwardly as shown. The diaphragm 15 constitutes a pressure responsive partition between pressure chambers 37 and 38 and being flexible moves up and down as viewed in response to differences in pressure in the chambers and thus translates the differential pressure into a corresponding vertically directed signal motion of the diaphragm assembly 40.

The lower section 35 of the pressure body 10 is also formed with a radially extending channel or passageway 46 which opens at the inner end into the lower portion of the lower pressure chamber 38, and at the outer end to the side of the lower section 35. Disposed within and freely movable within channel 46 is an inside lever 47 whose inner end 48 projects into the lower pressure chamber 38 and is mechanically connected to the diaphragm assembly 40 for movement therewith. The opposite or outer end of lever 46 in effect passes through and is pivotally supported by the pressure seal fulcrum assembly 19, described in detail below, and connects to the outside lever 20, see also Figure 1, for moving same. In a functional sense levers 47 and 20 act as a single lever which pivot about the fulcrum in assembly 19 in response to movement of diaphragm 15.

In order to protect the diaphragm 15 as well as the sensitive linkage to which it is operatively connected from damage as a result of surges and sudden fluctuations in pressure being measured, the diaphragm assembly 40 is designed to have limited vertical travel within the pressure body 10 and is connected to the inside lever 47 by means of a yieldable coupling. The diaphragm assembly comprises a hollow cylinder 52 open at the top end and having a bottom wall 53 with a central opening 54, see Figures 2 and 3. The cylinder 52 is threaded on the upper end to receive a threaded closure cap 55. The central portion of diaphragm 15 carries disks 56 clamped to opposite sides thereof, the lower disk being tightly seated on an external annular shoulder 58 on the side of the cylinder 52 by the pressure of cap 55 whose lower end bears tightly against the upper disk. Thus disks 56, cylinder 52 and cap 55 are connected to and move vertically together as a unit with the center portion of diaphragm 15.

Connection of the diaphragm assembly to the lever 47 is made by a preferably flat link 60, see Figures 2 and 3, having a shank 61 secured at one end by screw 62 to the end 48 of lever 47 and extending upwardly therefrom through opening 54 in cylinder 52 to the upper end of the cylinder. The portion of link 60 adjacent the bottom wall of the cylinder has a washer 63 fixed thereon and movable therewith and which constitutes a lower abutment or seat for a coiled spring 64. The upper end of spring 64 presses against a floating washer or upper spring seat 65 which has a depressed central portion 66 having a slotted opening 67 through which the shank 61 of link 60 extends for guided vertical movement. An enlarged head 68 on the upper end of shank 61 engages the top of spring seat 65 and limits downward movement of the link 60 relative to spring seat 65. A coiled relief spring 69 preferably of heavier gauge and thus having a greater spring force than spring 64 is disposed concentrically of link 60 within the cylinder 52 and exteriorly of spring 64 and is seated at its ends on bottom wall 53 of the cylinder and on the peripheral portions of the upper seat 65. I prefer that relief spring 69 normally be confined in the diaphragm assembly under compression of predetermined magnitude, so that it exerts a force, say 55 to 60 lbs., on upper spring seat 69, which force preferably is greater than the forces exerted by the diaphragm 15 when subjected to the maximum differential pressure in the range of operating pressures for which the instrument is designed. The end wall of cap 55 has an annular flange 70 against which the spring seat normally bears and which spaces the cap end wall from the head 68 of the link to permit limited guided upward movement of the link relative to the spring seat 65 for the purpose explained below. The diameter of spring seat 65 preferably is slightly less than the inner diameter of cylinder 52 so that the seat 65 may move axially within the cylinder.

Diaphragm disks 56 are disposed to move vertically with the diaphragm within an annular recess 72 defined by opposed shoulders 73 and 74 on the inner adjacent edge portions of the upper and lower sections 34 and 35 of the pressure body. Shoulders 73 and 74 preferably are spaced apart a distance greater than the combined thicknesses of disks 56 and thus define and limit the amount of free vertical movement of the diaphragm assembly. The extent of travel of the diaphragm assembly is thus safely limited and the danger of straining or otherwise damaging the associated linkage and the pressure seal fulcrum assembly 19 as a result of excessively unbalanced pressures and/or pressure surges is averted. The surfaces 75 and 75a of the upper and lower sections 34 and 35, respectively, adjacent the unsupported portions 15a of diaphragm 15 are curved to conform to the arcuate shape of the diaphragm to present an abutment or "back up" surface against which the diaphragm may rest when subjected to excessive unbalance of pressures.

The normal operating range of vertical movement of the diaphragm assembly, however, preferably is somewhat less than the limits of travel of diaphragm disks 56 in recess 72 in order to insure completely free movement of the assembly within that range. The diaphragm assembly is shown in Figures 2 and 3 in a neutral or central position corresponding to the lower limit of movement of the diaphragm. The operating limits for movement of the diaphragm are indicated in Figure 3, greatly exaggerated for purpose of explanation, by dot-dash line 76 and 77 representing the upper and lower limits, respectively, of diaphragm movement. Dot-dash lines 78 and 79 represent the upper and lower limits of movement of the upper and lower diaphragm disks 56, respectively, and correspond to the limits designated by lines 76 and 77 for diaphragm movement. The distance between limits 76 and 77, preferably is in the order of .002". It will be noted that limits 78 and 79 of movement of disks 56 are spaced by distances indicated at C from shoulders 73 and 74, respectively, which define the recess 70 in the pressure body. Distances C preferably are in the order of .060". The diaphragm assembly thus has free vertical movement between these limits and accurate measurement of differential pressure at the low and high points of the pressure range is assured. Since the transmitter is designed to measure differential pressure within a given adjustable range, say 0–200" of water, corresponding to movement of the diaphragm from lower limit 77 to upper limit 76, differential pressures in excess of the highest range for which the instrument is designed would subject the motion sensitive linkage and the pressure seal fulcrum assembly 19 to undue forces tending to damage them. Such damage might also occur if high static pressure is placed on either the low or high pressure side of the diaphragm as may occur in field service.

Full protection of the linkage and the pressure seal fulcrum assembly 19 from damage from such causes is afforded by my construction of the diaphragm assembly. If excessive pressure is applied on the lower side of diaphragm 15, the diaphragm moves upwardly and beyond limit 76, and relief spring 69 compresses when the limit 76 is passed permitting the cylinder 52, cap 55, diaphragm disks 56 and diaphragm 15 to continue moving until the disks and diaphragm seat against shoulder 73 and surface 75, respectively. Movement of spring seat 65, link 60 and lever 47 substantially ceases when limit 76 is reached. Similarly, if during field service, excessive pressure is applied to the upper side of the diaphragm, the whole diaphragm assembly moves downward and when the diaphragm passes the lower limit 77, spring 64 compresses when limit 77 is passed permitting cylinder 52, cylinder cap 55, and spring seat 65 along with the diaphragm and diaphragm disks to continue moving downward while link 60 and lever 47 do not move further. Under this condition, movement of spring seat 65 downwardly relative to link 60 is permitted by reason of the slotted opening 67 in the spring seat through which the link passes. The magnitude of the force which the diaphragm assembly can exert on lever 47 is determined by the force required to compress springs 64 and 69 and since these springs are selected and arranged to yield or compress when the limits of force which the mechanism can safely withstand is passed, excessive forces are limited by the action of the springs, and lever 47 along with the associated linkage and the pressure seal fulcrum assembly 19 are fully protected. Within the diaphragm operating limits and within the limits of force impressed on the diaphragm at the high point of the normal differential pressure range of the instrument, spring 69 furnishes a positive direct coupling between the diaphragm 15 and lever 47 so that displacement of the former however small in response to changes in differential pressure in the line is accurately sensed by the lever 47. Since the main function of inner coiled spring 64 essentially is to seat upper spring seat 66 against flanges 70 of the cap 55 for normal operation of the instrument, spring 64 may be and is shown as being of lighter gauge compared to relief spring 69.

The lower section 35 of pressure body 10 has another radially extending channel 81 formed oppositely from channel 46 providing access to the interior of the pressure body for assembly and maintenance purposes. Pressure plug 82 seals this channel.

*Pressure seal.*—The signal motion transmitted by pressure diaphragm 15 to lever 47 is carried to the lever 20 externally of the pressure body through pressure seal fulcrum assembly 19 located at the end of channel 46 in which inside lever 47 is disposed. The assembly 19 not only functions as a fulcrum for levers 47 and 20 and transmits the motion of lever 47 externally to lever 20 but also seals fluid under high static pressure within the body 10 and resists the outward thrust of lever 47 against the seal assembly, see Figures 2 and 4–7.

The pressure seal and fulcrum assembly 19 comprises a preferably cylindrical hollow coupling element 90 having a flanged open end 91 held tightly against a flat on the side of the lower pressure body section 35 by the inner end of elongated casing 12 under the pressure of screws 14. Coupling element 90 has an end wall 92 remote from its open end, the end wall 92 having a central aperture 93, see Figure 4, a pair of diametrically spaced apertures 94 and a similarly spaced pair of apertures 95. Aperatures 94 lie in a common plane, the vertical plane as illustrated in the drawings, and apertures 95 lie in a common plane, the horizontal plane as shown, perpendicular to the plane of apertures 94. Disposed within coupling element 90 is a cylindrical retainer piece 97 having a head 98 adjacent the coupling element end wall 92 and a threaded neck 99 secured within a tapped recess 100 in the end of lever 47. The outer preferably flat surface 101 of head 98 of the retainer 97 is axially spaced from the end wall 92 of the coupling element and head 98 has an external diameter which is slightly less than the internal diameter of coupling element 90 as shown.

A pressure sealing diaphragm 102 located within and adjacent the open end of the coupling element has its inner marginal edge portion pressed tightly between an annular external shoulder 104 on retainer 97 and the end of lever 47, the outer marginal edge portion of the diaphragm being likewise tightly pressed between a recessed shoulder 105 on coupling element 90 and a retainer ring 106 carried on the outer open end edge of channel 46. The unsupported or exposed portion of diaphragm 102 between the tightly gripped marginal edge portions thereof is semi-circular in cross-section, curving outwardly from the pressure body as shown. Diaphragm 102 has a formed convolution and preferably is made of any thin flexible metal having suitable corrosion resistant properties and being sufficiently resilient so as to bend or flex to accommodate pivoting of the levers 47 and 20 without appreciably affecting that motion and yet being sufficiently strong to seal high pressure fluid within channel 46 of the pressure body.

The use of a formed convolution sealing diaphragm has several advantages which contribute to the overall merit and accuracy of the pressure seal fulcrum assembly. Such a diaphragm is inherently strong and capable of withstanding high static pressures. The blowout force of fluid under pressure is distributed uniformly over the hemi-torus portion of the diaphragm which contributes to the overall efficiency and strength of the seal. This type of diaphragm is also advantageous because it may be made from a variety of materials preferably metals and metal alloys, thereby permitting selection of a diaphragm with corrosion resistant characteristics suitable for the particular application. Furthermore, this diaphragm is well adapted to resist blow off forces of the fluid under pressure in the pressure body without introducing moments of force that might deleteriously affect the accuracy of transmission of signal forces and motions by the pressure seal fulcrum assembly.

Figure 5:
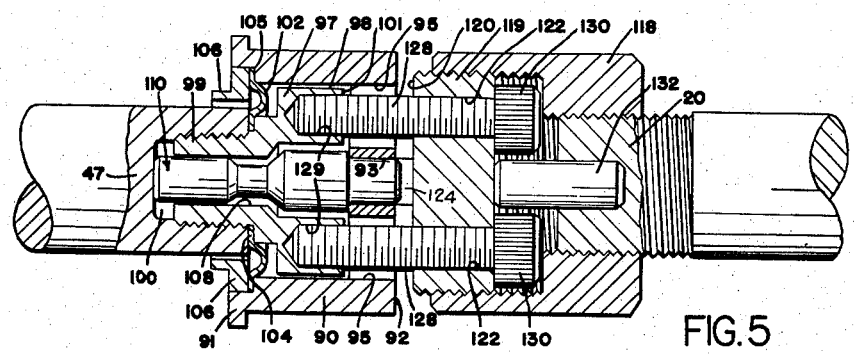
Figure 5 is a horizontal section through the pressure seal taken on the line 5—5 of Figure 4.
Figure 6:
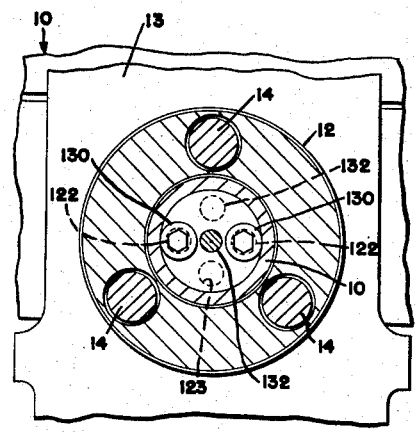
Figure 6 is a transverse section taken on the line 6—6 of Figure 2.
Figure 7:
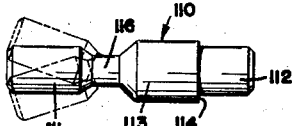
Figure 7 is an elevation of the thrust pin which forms a part of the pressure seal fulcrum assembly and constitutes part of my invention.

Retainer 97 has a central bore 108, see Figure 5, in which a one-piece thrust pin 110 is disposed to extend coaxially of the axis of lever 47 between the bottom of recess 100 in lever 47 and the end wall 92 of the coupling element 90. The inner left as viewed end portion 111 of the pin 110, see Figure 7, is press fitted and tightly held within the bore 108 of retainer 97 and firmly bottoms in recess 100 of lever 47, and the opposite or outer end portion 112 of the pin is similarly tightly secured within the central aperture 93 of the coupling element end wall 92. The pin 110 also has an enlarged section 113 the right as viewed end of which constitutes a shoulder 114 which abuts the inside of the coupling element end wall 92. When the coupling element 90 is secured in place tightly against the pressure body during assembly of the pressure seal, end wall 92 presses against shoulder 114 causing the left as viewed end 111 of the pin 110 to bottom in the lever recess 100. The right as viewed end of the plug bore 108 is countersunk as shown to provide a clearance between the retainer and the enlarged section 113 of the pin.

The portion of thrust pin 110 between the enlarged section 113 and the inner end portion 111 thereof is necked down as indicated at 116 to a diameter less than the internal diameter of plug bore 108. The neck portion 116 preferably has a sufficiently large diameter to effectively resist the thrust of lever 47 due to the static pressure within the pressure body and yet is small enough to permit the pin to flex, bend and/or pivot substantially about the mid point of the neck when a signal motion is transmitted through the pressure seal. The mid point of neck 116 constitutes the fulcrum of the pressure seal fulcrum assembly 19 about which inside lever 47 and outside lever 20 of the motion linkage rock as will be understood more clearly from the description below of the operation of the assembly 19.

In order to neutralize any deleterious effects of the forces of high static pressures on the transmission of a signal motion or force, the sealing diaphragm 102 is assembled in the mechanism in exact concentric relationship with the fulcrum point of pin neck 116, that is, the circle passing through the centers of the radii of the exposed semi-circular (in cross-section) or hemi-torus portion of the diaphragm is exactly concentric with fulcrum point and lies in the vertical plane of the fulcrum point. With such an arrangement, pivotal movement of the inner peripheral portion of the diaphragm in response to rocking movement of the lever 47 is slight and because, as presently advised, it is believed that the hemi-torus portion of the diaphragm tends to roll about the centers of formation of the hemi-torus, the mid point of the hemi-torus portion, that is, the center of the effective diaphragm area does not shift radially of the fulcrum point of pin 110. The reaction force of the diaphragm opposing the force of high static pressures in the pressure body, therefore, is uniform over the entire exposed portion of the diaphragm and concentric of the fulcrum point throughout the limited pivotal movement of the parts about the fulcrum. No moments of force as a result of the high static pressures in the pressure body are created. Hence, the tendency of such static pressures to unbalance the forces on the diaphragm during pivotal movement of the diaphragm and to upset the balance of forces normally acting on the movable parts of the assembly is eliminated. The signal motion or force transmitted to the external lever 20 therefore is directly proportional the signal generated by the measuring diaphragm 15.

The outer, right as viewed, end of the pressure seal assembly comprises a coupling element 118 secured to the inner end of lever 20 and attached by threads to an internally disposed coupling plug 119. Plug 119 is axially spaced from the end wall 92 of the inner coupling element 90 and is formed with a flat radial end surface 120 and two axially bored diametrically spaced apertures 122 which are aligned and lie in a common plane, the horizontal plane as shown in the drawings, and two cylindrical diametrically spaced recesses 123 aligned in a plane perpendicular to the plane of apertures 122 and extending on parallel axes into the plug from the surface 120 thereof. Recesses 123 in coupling plug 119 preferably are longitudinally aligned with apertures 94 in end wall 92 of adjacent coupling element 90 and are disposed to receive a pair of identical parallel spacer pins 124, the inner left as viewed ends 125 of which are preferably conically shaped and seat in correspondingly shaped shallow recesses 126 in the outer face 101 of retainer plug 97. When the pressure seal fulcrum assembly 19 is assembled and finally adjusted, as explained below, the axes of recesses 123 in coupling plug 119 preferably are parallel to the axis of plug 97 and pins 124 are firmly held between plugs 97 and 119 with the pin axes parallel to the axis of plug 97. Each pin 124 also has a shoulder 127 formed perpendicular to the axis of the pin and which abuts against the flat end surface 120 on coupling plug 118 and spaces retainer plug 97 from coupling plug 119. When the pressure seal fulcrum assembly is assembled, spacer pins 124 are compressed tightly between and parallel to the axes of plugs 97 and 119 and transmit rocking motion from plug 97 to plug 119 and hence through coupling element 118 to lever 20.

In order to draw retainer 97 and plug 119 tightly on spacer pins 124, screws 128 are provided. These screws extend through the longitudinally aligned apertures 122 and 95 in plug 119 and coupling element end wall 90, respectively, see Figures 5, 6 and 7, from the right, as viewed, end of plug 119 and engage threads in tapped holes 129 in head portion 98 of retainer 97. The head 130 of each screw 128 abuts tightly against the outer surface of coupling plug 119 and is spaced from the adjacent parts of coupling element 118. A central pin 132 disposed between plug 119 and lever 20 takes up any slack in the threaded connections of the coupling element 118 to the lever 20 and to plug 119. Screw apertures 95 in end wall 92 of coupling element 90 are formed to provide diametric clearance for the shank portions of adjusting screws 128 to prevent interference with operating movement of the movable parts. Screws 128 are in tension and pins 124 are in compression and thus there is no play in the coupling. Plug 119, coupling element 118 and lever 20 are securely and tightly connected as a unit to retainer 97 and thus sense and transmit any signals, force or motions, transmitted to the retainer by inside lever 47.

The operation of the pressure seal fulcrum assembly is as follows: The outer end portion 112 of thrust pin 110 is fixed with respect to the pressure body by means of coupling element 90 while the inner end portion 111 of the pin is fixed to and moves with lever 47. When the left, as viewed, end of lever 47 moves, for example, upward in response to upward movement of measuring diaphragm 15, pin 110 will bend slightly at substantially the mid portion of its neck 116 as indicated in dotted lines in Figure 7, permitting lever 47 to pivot about this point as a fulcrum. Since retainer 97 and the inner edge portion of sealing diaphragm 102 are secured to the outer end of lever 47, these parts will pivot in a clockwise direction in a vertical plane about the fulcrum defined by the bending of pin neck 116. The clockwise movement of retainer 97 is transmitted through spacer pins 124 to plug 119, to coupling element 118 and finally to lever 20. Since the centers of formation of the hemi-torus portion of the sealing diaphragm lie in the same vertical plane as the mid portion of neck 116 of thrust pin 110, that is, in the vertical plane of the fulcrum of the pressure seal fulcrum assembly 19, and since the inner edge portion of the diaphragm 102 is spaced closely to the fulcrum, the rotary movement of the diaphragm is not only slight but is such as to maintain the circle whose circumference is the locus of the mid points on the hemi-torus surface of the diaphragm concentric with the fulcrum point during movement of the diaphragm. The force resulting from the pressure on the entire exposed area of diaphragm 102 is thus substantially uniform and fully balanced with respect to the fulcrum point even when lever 47 has been rocked to the extreme limits of its movement. Since the centers of the effective area of the sealing diaphragm 102 are concentric with axis of the neck 116 of pin 110, no moments of force resulting from high static pressures on diaphragm 102 are developed, and the signal, either motion or force, however small, that is transmitted through the pressure seal fulcrum assembly is directly proportional to the signal transmitted by the measuring diaphragm 15 in the pressure body 10.

The high degree of concentricity required in the sealing diaphragm 102, thrust pin 110, coupling element 90 and retainer 97 is obtainable by use of accurate machine tools. By accurately machining these parts, closely controlled concentricity is built into the components and the necessity of manual alignment is eliminated. Thus mass production of these parts is possible without substantial loss of accuracy. In order to eliminate or neutralize any trace of error that might be reflected in signal transmission through the pressure seal fulcrum assembly by reason of slight non-concentricity of the assembly, the parts are fitted together and preliminarily tested by subjecting the seal to high static pressures. The plane of movement of the movable parts due to non-concentricity of the diaphragm is noted and in the final assembly the components are arranged so that the plane of error movement is perpendicular to the plane of operative movement of the measuring diaphragm.

In practice, I have used a thrust pin 110 made of hardened and drawn stainless steel and having a neck portion $\frac{1}{8}''$ long by $\frac{1}{8}''$ in diameter in conjunction with a sealing diaphragm with a hemi-torus portion having an O.D. of $\frac{3}{4}''$, an I.D of $\frac{1}{2}''$ and a depth of about $\frac{1}{16}''$. This thrust pin successfully withstood forces in excess of 3500 lbs., and the sealing diaphragm withstood forces in excess of 10,000 p.s.i.g. High sensitivity and long life therefore can be realized for the transmitter even when operating under conditions of extremely high static pressures.

"Zero adjustment" for the transmitter is provided by means of the calibration spring 150 which is anchored at its upper end to an adjustable support 163 on rigid frame member 23 and is connected at the lower end to lever arm 25 of the linkage 22 intermediate the differential transformer 28 and the frame member 134. Spring 150 normally in tension exerts an upward force on lever arm 25 which may be varied by means of a screw 164. Since the force exerted by the pressure measuring diaphragm 15 on the motion transmitting linkage must first overcome the spring rate of spring 150 before a signal motion can be transmitted to the differential transformer core, adjustment of the tension of spring 150 by screw 164 provides a convenient manner of suppressing the pressure range through which measuring diaphragm 15 is operative, that is, in selectively varying the point on the differential pressure range scale at which the instrument begins to send a signal. This is commonly known as a "zero" adjustment of the transmitter.

If the spacing between the movable and fixed pivots is decreased by adjustment of screw 30, that is, movable pivot 27 is moved to the right as viewed, the moment arm is decreased and link 24 must exert a greater force on movable pivot 27 to cause the transformer core to move a given distance. Similarly, increasing the space between the movable and fixed pivots 27 and 26, respectively, by moving pivot 27 to the left as viewed, increases the moment arm of the linkage, thereby requiring a lesser force exerted by link 24 on pivot 27 to move the differential transformer core the same distance. Since the force exerted by link 24 on pivot 27 is directly proportional to the force exerted by pressure diaphragm 15 in response to the pressure impressed on it, it is apparent that adjustment of screw 30 to move pivot 27 to the right toward fixed pivots 26 will result in increasing the effective spring rate of the whole linkage 22 as sensed by the measuring diaphragm 15 and require a greater pressure differential across the measuring diaphragm to move the core of the differential transformer through its full range of travel. Conversely, adjustment of screw 30 to move pivot 27 to the left as viewed away from fixed pivots 26 decreases the effective spring rate of the linkage 22 and a lesser differential pressure acting on the measuring diaphragm 15 is required to move the differential transformer core over its full range of travel. Thus screw 30 permits accurate, continuous and wide adjustment of the span of pressure range to which the transmitter is responsive without the necessity of the operator changing components of the transmitter or otherwise touching the sensitive moving parts of the instrument. Furthermore, this adjustment may be made in the field to adapt the transmitter for response to a wide range of pressures without affecting the factory assembly of the instrument. By way of example, the span of the pressure range to which my transmitter is responsive may be adjusted solely by means of screw 30 from about 0–20″ to 0–200″ of water.

As mentioned above, the total spring rate of linkage 22 is the substantially constant spring rate of calibration spring 150 and is the effective spring rate of the linkage as seen by the diaphragm. Adjustment of this effective spring rate of the linkage through adjustment of the position of movable pivot 27 relative to fixed pivots 26, and thus adjustment of the pressure range of the transmitter, will cause some shift of the "zero" adjustment of the instrument. When it is desired that pressure range be adjusted, the tension on calibration spring 150 preferably is varied by means of tension adjusting screw 164 to the proper value after movable pivot 27 has been set to the proper position by screw 30 for the new pressure range, thus resetting the "zero" adjustment.

In order to provide fine or vernier adjustment of the pressure range span of the instrument, a variable resistor 165 operatively connected to the differential transformer circuit is secured to member 23 of the mounting frame F with the resistor actuating shaft extending above the frame for convenience in adjusting the resistance value. Resistor 165 is connected in series in the differential transformer input circuit and thus provides an adjustment of the magnitude of the signal voltage output from the transformer for a given displacement of the transformer core, that is, in essence, a variation in pressure range to which the instrument is responsive. When the variable resistor is used in this manner, screw 30 is termed a "coarse" pressure range span adjusting screw. Resistor 165 preferably provides a fine pressure range span adjustment of approximately ±20% of the total range and is useful for final span calibration since it does not affect the "zero" adjustment of the instrument. In many installations, however, variable resistor 165 may be omitted, since screw 30 alone provides a sufficiently accurate adjustment of pressure range to meet most of the requirements of industry.

In order to dampen vibrations in the motion sensitive linkage 22, I provide a fluid filled dampener device 170 supported by a bracket 171 to the base of the mounting frame extension 155. Dampener 170 permits normal low frequency pivotal movements while absorbing or dampening undesirable high frequency vibrations. The structural features of dampener 170 are described fully in my copending application Serial No. 376,930, filed August 27, 1953, and entitled Vibration Dampener.

Deadweight calibration of the instrument is facilitated by means of a stud 180 secured to and projecting from lug 148 on the outer end of lever 20. Calibration weights suspended from the end of stud 180 impose a predetermined force on link 24 of the linkage 22 corresponding to the force exerted on lever 20 by measuring diaphragm 15 in response to a known differential pressure, and thus the instrument may be tested, calibrated and adjusted before the pressure body 10 is operatively connected to the pressure line.

While I have illustrated and described a preferred form of my invention in conjunction with a differential transformer as a signal conversion device, it will be understood that other devices, such as pneumatic relays and the like may also be used equally successfully with my transmitter as signal conversion means. The movement of the measuring diaphragm 15 is relatively small for the entire range of values of the variable being measured and thus the transmitter may readily be used in a "force balance" system of signal transmission.

Changes, modifications and improvements may be made to the above described preferred form of my invention without departing from the precepts and principles of the invention. Therefore I do not wish my patent to be limited to the particular form of my invention specifically illustrated and described nor in any manner inconsistent with the extent to which my invention has promoted the art.

I claim:

1. In a transmitter having a pressure body and a measuring element movable in response to a variable being measured, a lever in said pressure body operatively connected at one end to and movable with said element, the other end of said lever being located adjacent the exterior of said body, a hollow coupling element secured to the exterior of said pressure body and having an end wall traversing and axially spaced from said other end of said lever, a retainer disposed within said coupling element and connected to said other end of said lever, said retainer having an axial bore, a pin having one end tightly pressed into a portion of the bore of said retainer adjacent said lever, the other end of the pin being supported by and abutting the end wall of said coupling element and having clearance with said bore in the retainer, said pin being bendable about a fulcrum point intermediate the ends thereof and resisting thrust of said lever, an annular hemi-torus shaped diaphragm surrounding said retainer and having peripheral flanges, the outer periphery of said diaphragm being secured to and sealed against said pressure body, the inner periphery of said diaphragm being secured to and sealed against said lever, the centers of the radii of the hemi-torus shaped portion of the diaphragm being concentric with and lying in the plane of said fulcrum point, another lever disposed exteriorly of said body, and means for rigidly coupling said another lever to said retainer whereby said levers rock about said fulcrum point in response to and proportional to movement of said measuring element.

2. A transmitter according to claim 1 in which said coupling element end wall has a plurality of apertures formed therein, said last named means comprising a coupling means on said externally disposed lever, spacer pins abutting and axially spacing said retainer and said coupling means, said spacer pins extending through and clearing said apertures in said coupling element whereby to permit rocking movement of said spacer pins relative to said coupling element and means for drawing said retainer and said coupling means tightly on said spacer pins.

3. In combination, a pressure vessel having an aperture, a lever extending through said aperture from the interior to the exterior of said pressure vessel and universally swingable about a point in said aperture and having a mid-portion adjacent said aperture, a fulcrum member having end portions and having a flexible part therebetween embracing said point, said fulcrum member having one end portion fixedly secured to said lever near said mid-portion, means for sealing said aperture around the said mid-portion of said lever and having its center of effective area at said point and means for maintaining the said center of effective area of said sealing means at said point during universal swinging motion of said lever, said sealing means being concentric of the said flexible part of said fulcrum member and preventing leakage of fluid between said lever and said vessel and permitting universal swinging motion between said lever and said vessel in said aperture, and means for securing the other end portion of said fulcrum member immovably relative to said vessel and restraining said lever from axial motion relative to said vessel and supporting said lever for universal swinging and non-axial motion relative to said vessel during flexure of said flexible part, said means and said lever being freely movable relative to each other.

4. In combination, a pressure vessel having a wall with an aperture, a lever extending through said aperture from the interior to the exterior of said pressure vessel and swingable about a point which is fixed in relation to said vessel and said lever having a mid-portion adjacent said point, a fulcrum member having end portions and having a flexible part therebetween embracing said point, said member having one end portion fixedly secured to said lever near said mid-portion, the other end of said member being spaced from said lever and freely movable relative thereto, sealing means adjacent said wall and surrounding the said mid-portion of said lever and preventing leakage of fluid from said vessel and having its center of effective area at said point and means for constraining said center of effective area to remain at said point during swinging motion of said lever, said sealing means being concentric of the said flexible part of said fulcrum member and permitting motion between said lever and said vessel, and means for securing the said other end portion of said fulcrum member immovably relative to said vessel and restraining said lever from axial motion relative to said vessel and supporting said lever for non-axial motion relative to said vessel during flexure of said flexible part, said means and said lever being freely movable relative to each other.

5. In combination, a pressure vessel having an aperture, a lever extending through said aperture from the interior to the exterior of said pressure vessel and swingable about a point which is fixed in relation to said vessel, fulcrum means having relatively movable parts and having a fulcrum point therebetween substantially coinciding with said fixed point, said fulcrum means having one part fixedly secured to said lever near said fixed point, sealing means adjacent said fixed point and surrounding said lever and contacting said vessel and preventing leakage of fluid from said vessel and having its center of effective area at said fixed point and means tending to hold said center of effective area at said point during swinging motion of said lever, said sealing means permitting motion between said lever and said vessel, and means for securing the other part of said fulcrum means immovable relative to said vessel and restraining said lever from axial motion relative to said vessel and supporting said lever for non-axial motion relative to said vessel, said lever and said last named means being freely movable relative to each other.

References Cited in the file of this patent

UNITED STATES PATENTS

| | | | |
|---|---|---|---|
| 1,291,869 | Heeley | Jan. 21, | 1919 |
| 1,389,728 | Akimoff | Sept. 6, | 1921 |
| 1,579,536 | Hodgson | Apr. 6, | 1926 |
| 2,307,492 | Davenport | Jan. 5, | 1943 |
| 2,402,435 | Newton | June 18, | 1946 |
| 2,457,320 | Rosenberger | Dec. 28, | 1948 |
| 2,612,908 | Tate | Oct. 7, | 1952 |
| 2,626,626 | Rosenberger | Jan. 27, | 1953 |
| 2,632,329 | Zuehlke | Mar. 24, | 1953 |
| 2,647,398 | Marvel | Aug. 4, | 1953 |
| 2,672,890 | Boles | Mar. 23, | 1954 |
| 2,742,784 | Brous | Apr. 24, | 1956 |
| 2,781,665 | Li | Feb. 19, | 1957 |